Oct. 14, 1958    M. M. SCHUSTER ET AL    2,856,192
COLLET WITH SPRING JAWS

Filed Oct. 29, 1956    2 Sheets-Sheet 1

INVENTORS:
MICHAEL M. SCHUSTER
CARL E. MOORE
OREN C. WILKINS

By D. Gordon Angus
ATTY.

INVENTORS:
MICHAEL M. SCHUSTER
CARL Z. MOORE
OREN C. WILKINS
By D. Gordon Angus
ATTY.

United States Patent Office 2,856,192
Patented Oct. 14, 1958

2,856,192
COLLET WITH SPRING JAWS

Michael M. Schuster, Inglewood, and Carl Z. Moore and Oren C. Wilkins, Redondo Beach, Calif., assignors to Hi-Shear Rivet Tool Company, Torrance, Calif., a corporation of California Application October 29, 1956, Serial No. 619,004

4 Claims. (Cl. 279—50)

This invention relates to a collet attachment for machine tools. An object of this invention is to provide a collet which can open to receive and close to hold headed workpieces, and which is capable of undergoing a large number of opening and closing cycles without structural failure.

An additional object of the invention is to provide a collet which has an initially rapid and successively slower rate of closure when being clamped onto a workpiece.

Conventional collets have been inherently incapable of handling headed articles, particularly when the heads were comparatively thin (such as screw heads) and could not stand the forces necessary to hold the workpiece in position. For this reason the articles could not be held by the head. With conventional collets, the articles could not be held by the shank, either, because to get to the shank, the collet would have to open wide enough to pass over the head and then clamp down onto the shank. This has not been possible, because conventional collets are usually able to open and close only a few thousandths of an inch. This is barely enough to let a cylindrical body into the opening, and definitely not enough to open and pass a head and then clamp down onto a smaller shank. For these reasons, complicated chucks have had to be used for holding headed articles during machining instead of using a simple collet.

According to this invention, a wide-opening collet, which may be attached to a lathe spindle or the like, is provided with a plurality of gripping segments which, when compressed together, grip a workpiece. Each of the segments is provided with a section where maximum flexure occurs, which section is preferably, but not necessarily a flat leaf in shape, and which is relatively more flexible compared to the rest of the collet.

According to a preferred but optional feature of the invention, each of the segments is provided with an outer surface having two different angles relative to the central axis of the collet, whereby a collar moved axially along the collet compresses the segments more rapidly when "climbing" the larger of the two angles, than when climbing the smaller.

According to still another feature of the invention, each segment is provided with an undercut interior shoulder at its free end so that said shoulder can overhang a head on a workpiece and grip the shank of said workpiece.

The above and other features of this invention will be fully understood from the following detailed description and the accompanying drawings, of which:

Figure 1:
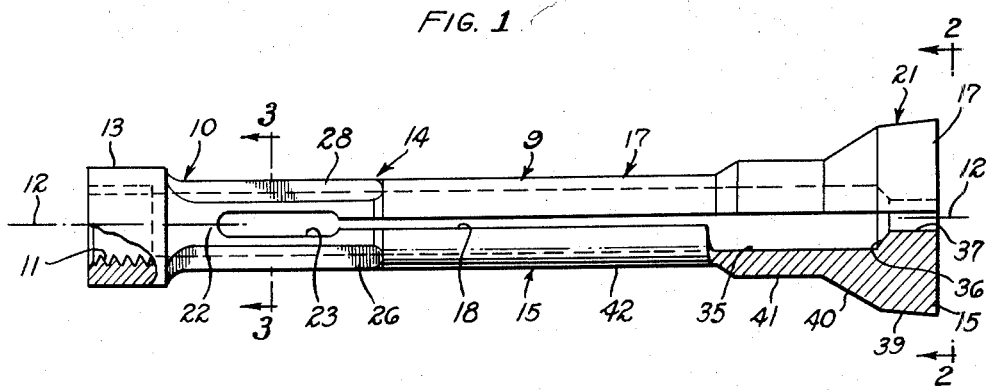
Fig. 1 is a side elevation, partly in cutaway cross section, of a collet according to this invention.

In Fig. 1 there is shown a collet 9 having an attachment end 10 with a threaded bore 11 by which the collet may be attached to a lathe or similar machine tool. The threaded bore 11 and an outer surface 13 outside the threaded bore are both concentric around a center line 12 of the collet.

The collet has a main body 14 which is integral with the attachment end 10. The main body 14 is divided into three segments 15, 16 and 17 by slots 18, 19 and 20 which slots may be of any convenient width, since their only purpose is to separate the segments. The three slots 18, 19 and 20, spaced 120 degrees apart are best viewed in Fig. 2 which shows an end view of a slotted gripping end 21. It will be understood that more or fewer segments may be provided instead of three. Three segments provide a suitable and simple construction.

Figure 3:
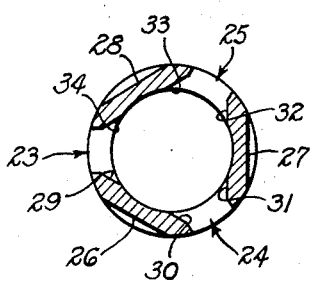
Fig. 3 is a cross section taken at line 3—3 of Fig. 1.

The three slots each lie longitudinally with respect to the center line 12 as shown by the position of slot 18 in Fig. 1. The three slots start at the gripping end 21 of the collet, and a base end 22 of each of the slots is located near the attachment end. Just adjacent the base end of each slot, said slots are enlarged to approximately three times their width near the gripping end. Enlarged slot portions 23, 24 and 25 are best shown in Fig. 3. The enlarged slot portion 23 of slot 18 is also shown in Fig. 1.

Flat outer surfaces 26, 27 and 28 are milled or otherwise formed between the enlarged slot portions as shown in Figs. 1 and 3. Three spring leaves are formed at the point of maximum flexure of the segments, one on each of the segments, by providing inner flat surfaces 29, 30, 31, 32, 33 and 34 which extend the length of the enlarged slot portions. Surfaces 29 and 30 are parallel to outer surface 26 and in a similar manner surfaces 31 and 32 are parallel to outer surface 27 and surfaces 33 and 34 are parallel to outer surface 28.

The three segments 15, 16 and 17 of the main body 14 have inner surfaces 35, which are concentric around the center line 12, and which extend longitudinally from near inner flat surfaces 29, 30, 31, 32, 33 and 34 to a position near the end of the collet having the gripping end 21. The three segments of the collet have inner shoulders 36 which are undercut and which are concentric around the center line 12. Gripping surfaces 37 on each of the three segments which are concentric around the axis 12, extend axially from the shoulders 36 to the end of the collet having the gripping end 21. The gripping surfaces 37 have a grip length, measured in the direction of center line 12, which may be of any desired length. The radius of the concentric gripping surfaces 37 is determined by the diameter of a workpiece to be held by the collet.

Figure 2:
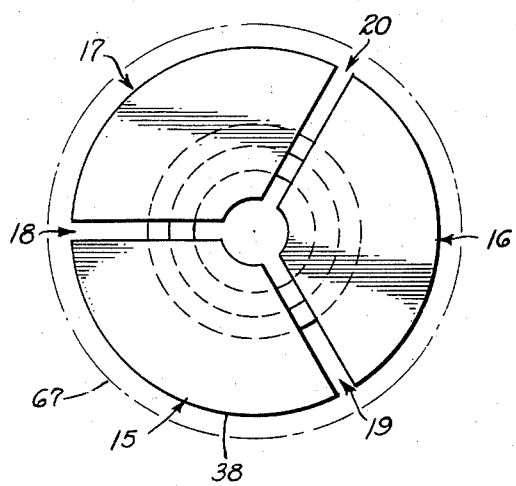
Fig. 2 is an end view of the device of Fig. 1, taken at line 2—2 of Fig. 1.

The gripping end 21 of segments 15, 16 and 17 when the collet segments are in the position shown in Fig. 2, has a large diameter 38 which is concentric around the center line 12. The outside of gripping end 21 also has surfaces 39 on the three segments which are concentric around the center line 12 and together the three surfaces 39 have a frusto-conical form which decreases in diameter from diameter 38 at some small angle, for example at a 5 degree conical angle relative to the center line 12, when the collet is in the condition shown in Fig. 1.

Adjacent to the small diameter end of the frusto-conical form made up of the concentric surfaces 39, a second frusto-conical form is made up of the concentric surfaces 40 on the three segments. The frusto-conical form made up of the concentric surfaces 40 decreases in diameter to the left in Fig. 1 at some larger angle than the angle made by surfaces 39 when the collet is compressed as shown in Fig. 1, for example at a 30° or 35°, conical angle relative to center line 12. Outer surfaces 41 on the three collet segments are concentric around the center line 12 and extend an appreciable length in the direction of the center line 12. Short chamfer surfaces are provided between the outer collet surfaces 41 and the surfaces 42 of the collet body segments.

Figure 4:
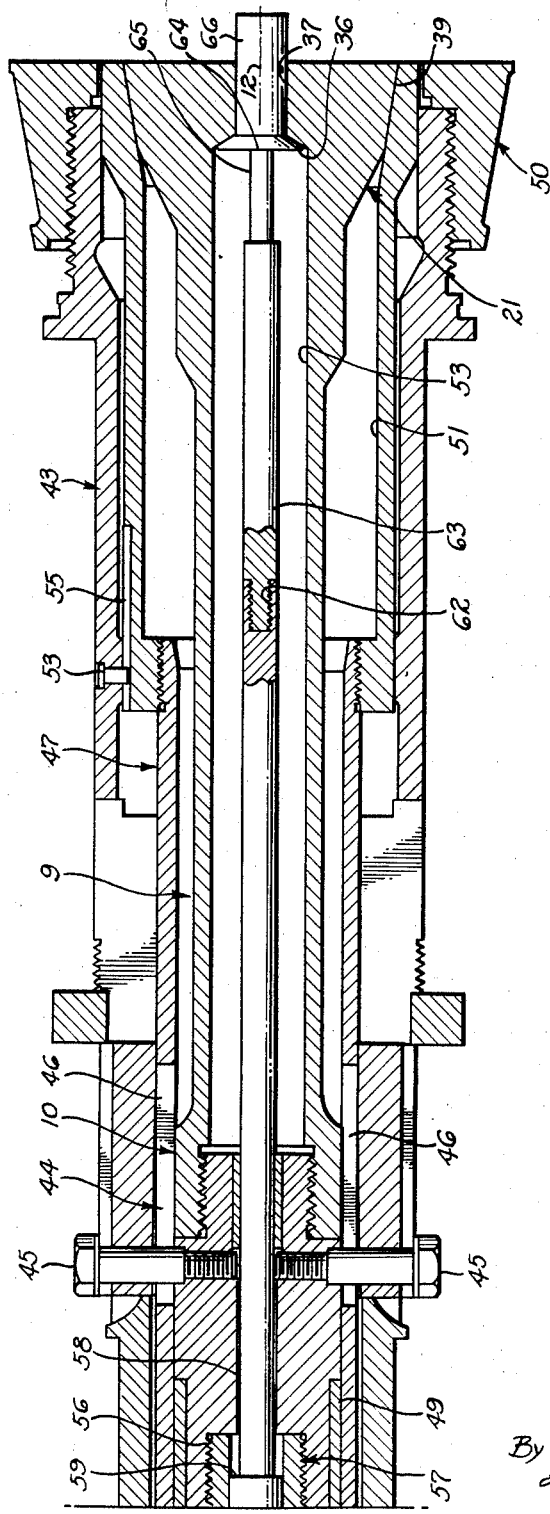
Fig. 4 shows a portion of a spindle assembly incorporating the device shown in Figs. 1-3.

The collet is spring tempered from its attachment end 10 to positions on the concentric surfaces 42 located near concentric surfaces 41. For use with a lathe spindle, the segments are bent outward and given a permanent set, so that their normal position is spread apart. They are restored to the position shown in Fig. 1 by means of a collar moved axially, as illustrated in Fig. 4. The amount the uncompressed collet opens can be varied by simply bending the segments further apart. The "leaf" construction at the base of the segments of this collet renders the segments more flexible than conventional collet segments, and thereby permits a wider opening at the gripping end of the collet for ease in inserting the workpiece, without breaking off the segments. The terms "leaf" or "spring leaf section" as used herein, relate to a portion of the collet segments which is relatively more flexible than the rest of the segment. In the preferred embodiment as illustrated, this is a portion of the segment which is substantially rectangular in cross-section, as viewed in a section perpendicular to axis 12, and in which the longest side dimension of the rectangle lies perpendicular to a line which is normal to the said axis.

The slotted or split collet 9, with the leaf construction described above, is shown installed in a spindle assembly 43 in Fig. 4. The collet 9 is attached within the spindle 43 to a threaded shaft 44 of the spindle by threading the attachment end of the collet onto external threads on the shaft 44. Threaded bolts 45 are threaded into the shaft 44, and act as restraining guides in slots 46.

A spindle linkage 47 lies longitudinally between the shaft 44 and an outer spindle part 43. The spindle linkage is shown in an actuated position in Fig. 4. In Fig. 4 there is shown a bushing 49 which provides a smooth bearing surface for the linkage to slide upon. A large end nut 50, which is threaded onto the outside of spindle part 43, is removable for access to the collet. With end nut 50 removed, the collet may be attached or removed.

A movable sleeve 51 is attached to linkage 47. This movable sleeve 51 is shown in its actuated position in Fig. 4. It is restricted to longitudinal motion with respect to the outer spindle part 43 by means of a key 53 through the outer spindle part, which key projects into a longitudinal key slot 55 in the movable sleeve.

In the actuated position shown in Fig. 4, the outer surface of the movable sleeve 51 is parallel to the inner wall of the hollow spindle 43 and the inner surface of the movable sleeve is parallel to the surfaces 39 on the segments of the collet. The collet segments are shown compressed by the movable sleeve 51 so that the internal gripping surfaces 37 of the collet are parallel to the center line 12.

In Fig. 4 there is shown a threaded bore 56 in the shaft 44 for receiving an externally threaded tube 57. A rod 58 has a shoulder 59 which limits the longitudinal movement of the rod toward the collet and workpiece. When no workpiece is held by the collet, the rod is moved by a coil spring (not shown) so that the shoulder 59 bottoms in bore 56, thus ejecting a finished workpiece. When a workpiece is inserted in the collet, the rod forces the workpiece toward the gripping surfaces to a correct position. The center rod 58 extends through a bushing 60 which acts as a bearing surface for the rod.

The rod 58 extends along axis 12, through the collet. The rod 58 is provided with a threaded bore 62 in which a rod extension 63 is threaded. The rod extension 63 may be of any desired length and shape suitable to the type of workpiece to be engaged by the collet. The end surface 64 of the rod extension and its side surface 65 may both be designed to contact and hold a workpiece in a predetermined position when the collet 9 is clamped around a workpiece 66.

To clamp a workpiece such as piece 66 in Fig. 4 within the collet, the workpiece is placed into the open collet, against the extension piece 63 of the spring loaded center rod 58, with sleeve 55 retracted to permit the collet segments to spread. With the workpiece 66 inserted, the shoulder 59 is spaced from the bottom of bore 56. The collet is then clamped about the workpiece 66 by moving sleeve 51 axially to the right to the position shown in Fig. 4. In Fig. 2, a broken circle 67 represents the outer margin of the collet segments when the gripping end 21 is in its expanded position.

In moving the sleeve 51 to the right to close the collet, its inner surface first contacts surfaces 40, which are steeper than surfaces 39. A given axial speed of movement of sleeve 51 thereupon gives a relatively rapid initial closure rate, during which time rod 58 and rod extension 63 are forcing the workpiece against the chamfer 36. At this time, the operator can "work" the workpiece into a correct position, if necessary.

After further movement, the sleeve 51 contacts surfaces 39, which have a lesser conical angle. This results in a lower closure rate. When the sleeve reaches the position shown in Fig. 4, the workpiece is firmly grasped by the collet, and can be worked upon.

To release the workpiece, the sleeve 51 is withdrawn to the left from the position shown in Fig. 4, and the collet segments spring apart. The workpiece can then be removed from between them.

The flexibility of the segments of this collet permit the collet to open wide enough to pass the head of an object, and then to close so that gripping surfaces 37 clamp onto the shank of the workpiece. The headed workpiece is thereby held firmly by the collet. Previously-known collets have not had the ability to open so wide, and therefore they could not handle most headed workpieces. The head of workpiece 66, for example, would be destroyed or distorted by collet forces sufficient to hold it in position. With the collet of this invention, the gripping surfaces 37 can be made quite large in area and thereby provide an even more effective means for retaining the workpiece.

The spring leaf portions of the segment provide an inherently more flexible region at the position of greatest flexure than conventional collets, wherein the segments have a substantially uniform cross-section all along their pendant portions. This spring-leaf flexibility results in a segment which can undergo many cycles of opening and closing without failure.

By providing the spring leaf segments with a flat rectangular cross-section, whereby the leaves are broader than they are thick, an increased resistance to distortion by torque forces is obtained.

This invention is not to be limited by the embodiment shown in the drawings, and described in the description, which is given by way of example and not of limitation, but only in accordance with the scope of the appended claims.

We claim:

1. A collet having a central axis, said collet being adapted for attachment to a spindle, said spindle having a means for compressing said collet, said collet comprising a plurality of segments separated by slots, said segments each being attached to a common attachment member, said segments each having, at a position adjacent to said attachment member, a spring leaf section so disposed as to permit greater flexibility of each of said leaf sections in bending toward and away from said central axis than in any other direction, each of said segments having an internal gripping surface and an internal undercut shoulder adjacent to said gripping surface between said gripping surface and the attachment member, whereby said internal gripping surfaces are in a closed gripping position when said spindle means for compressing said collet compresses said plurality of collet segments toward said central axis; whereby said undercut shoulders, to restrain the head of a workpiece against axial movement out of the collet and the internal gripping surfaces exert a clamping action to hold said workpiece against both axial and rotary movement relative to the collect so as to prevent a workpiece from slipping free when the workpiece is gripped by said gripping surfaces of the segments of the collet.

2. A collet according to claim 1 in which the said spring leaf sections are substantially rectangular in a cross-section taken perpendicular to the axis of the collet, the rectangle having its longer side dimension perpendicular to a line normal to said axis.

3. A collet according to claim 1 in which each segment has, at its end away from the attachment means on the outside of said end, a pair of fragments of conical frustums, the frustum nearer the attachment member having a smaller diameter and greater conical angle than the frustum farther from said attachment means.

4. A collet according to claim 3 in which the said spring leaf sections are substantially rectangular in a cross-section taken perpendicular to the axis of the collet, the rectangle having its longer side dimension perpendicular to a line normal to said axis.

References Cited in the file of this patent

UNITED STATES PATENTS

| | | |
|---|---|---|
| 1,232,735 | Torvik | July 10, 1917 |
| 2,343,570 | Nelson | Mar. 7, 1944 |
| 2,415,482 | Greenough | Feb. 11, 1947 |
| 2,475,519 | Robichaud | July 5, 1949 |
| 2,545,628 | O'Connell | Mar. 20, 1951 |

FOREIGN PATENTS

| | | |
|---|---|---|
| 108,296 | Great Britain | Aug. 2, 1917 |